United States Patent
Engelsmann et al.

[15] 3,657,984
[45] Apr. 25, 1972

[54] PHOTOGRAPHIC APPARATUS WITH ELECTRONIC EXPOSURE CONTROL

[72] Inventors: Dieter Engelsmann, Unterchaching; Dieter Maas; Kurt Zattler, both of Munich, all of Germany

[73] Assignee: Agfa-Gevaert Aktiengesellschaft, Leverkusen, Germany

[22] Filed: June 12, 1970

[21] Appl. No.: 45,823

[30] Foreign Application Priority Data

June 27, 1969 Germany..................G 69 25 545.4

[52] U.S. Cl...................95/11 R, 95/31 EL, 95/31 FS, 95/53 E
[51] Int. Cl..........................................G03b 19/04
[58] Field of Search............95/11, 11.5, 10 C, 31 FS, 31 EL, 95/53 E; 240/1.3

[56] References Cited

UNITED STATES PATENTS

| | | | |
|---|---|---|---|
| 3,439,596 | 4/1969 | Peterson et al. | 95/11 |
| 3,524,393 | 8/1970 | Greger et al. | 95/11 R |
| 3,410,187 | 11/1968 | Kaneko | 95/31 FS |
| 3,351,413 | 11/1967 | Kono | 352/72 |

FOREIGN PATENTS OR APPLICATIONS 1,232,013  1/1967  Germany.....................95/31 E

*Primary Examiner*—Samuel S. Matthews
*Assistant Examiner*—Robert P. Greiner
*Attorney*—Michael S. Striker

[57] ABSTRACT

The top portion of the housing in a still camera has an opening for insertion and withdrawal of a drawer-shaped insert which contains one or more removable batteries and is received in a socket of an insulating plate which is mounted in the housing and supports one or more potentiometers, transistors or other components of the electronic exposure control. Such components are accessible by way of the opening upon removal of the insert. A wheel on the insulating plate can be rotated by hand and serves to adjust the exposure control in accordance with the guide number of a flash unit and/or in accordance with the speed of film. The wheel also serves to partially expel the insert from the socket. Leaf springs are employed to clamp the insert in the socket and to connect the poles of the battery into the circuit of the exposure control.

10 Claims, 2 Drawing Figures

PATENTED APR 25 1972 3,657,984

INVENTOR
DIETER ENGELSMANN
DIETER MAAS
BY KURT ZATTLER

Michael S. Striker
Attorney

PHOTOGRAPHIC APPARATUS WITH ELECTRONIC EXPOSURE CONTROL

BACKGROUND OF THE INVENTION

The present invention relates to improvements in photographic apparatus with electronic exposure controls. More particularly, the invention relates to improvements in the assembly of electronic components and their mounting in the exposure control of a still camera or motion picture camera. Still more particularly, the invention relates to improvements in photographic apparatus with electronic exposure controls of the type receiving electrical energy from one or more sources of D-C current.

SUMMARY OF THE INVENTION

An object of the invention is to provide a photographic apparatus wherein at least some components of the electronic exposure control are assembled and mounted in a space-saving manner and with a view to afford convenient access to some or all of such components.

Another object of the invention is to provide a photographic apparatus wherein the source of electrical energy is installed in a novel way to insure convenient access in the event of exhaustion.

A further object of the invention is to provide a novel and improved mounting for such component or components of the electronic exposure control in a photographic apparatus which are likely to require intermittent inspection, replacement and/or repair.

An additional object of the invention is to provide a photographic apparatus with adjusting means for the electronic exposure control, for example, with means which can adjust the exposure control in accordance with the guide number of a source of artificial illumination and/or in accordance with the sensitivity of film, and to construct and assemble the adjusting means in such a way that it can perform one or more additional functions.

A concomitant object of the invention is to provide a still camera with novel means for interchangeably supporting one or more batteries or analogous energy sources for connection in the circuit of the exposure control.

The improved photographic apparatus comprises a housing having an opening, for example, in the top portion of the housing, an insulating plate-like carrier installed in the housing and having a preferably U-shaped recess or socket which is adjacent to the opening in the housing, an electronic exposure control mounted in or on the housing and including at least one component which is mounted on the carrier, a preferably drawer-shaped insert which is received in the socket of the insulating carrier and is withdrawable therefrom by way of the opening in the housing, a source of D-C current supported by the insert, and conductor means separably connecting the component or components of the exposure control with the poles of the energy source.

The opening in the housing affords access to one or more components of the exposure control upon withdrawal of the insert.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
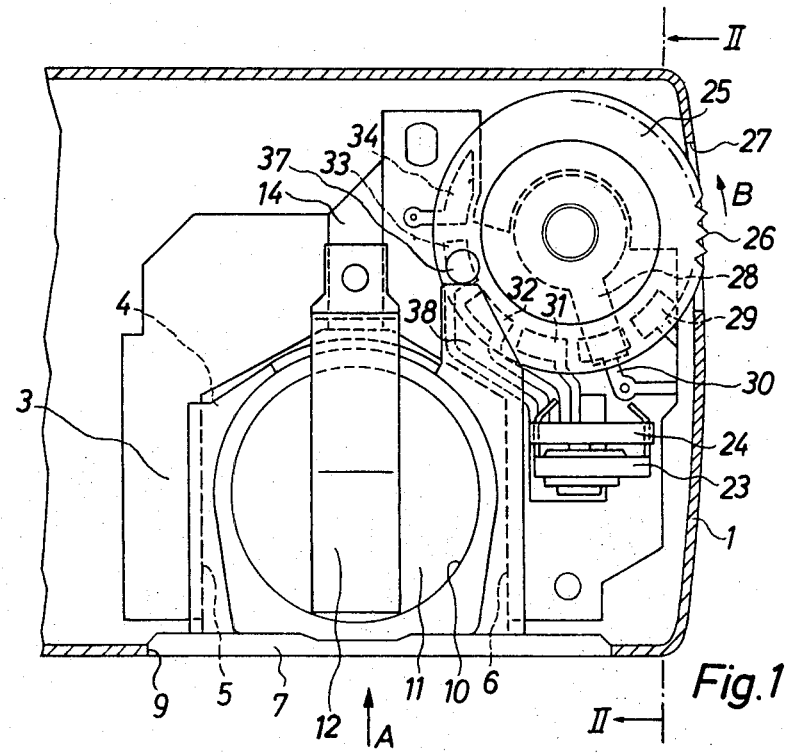
FIG. 1 is an enlarged fragmentary horizontal sectional view of a still camera which embodies the invention.

The numeral 1 denotes the top portion of the housing 2 of a still camera which defines a chamber 1a for a plate-like carrier 3 of a printed circuit. The carrier 3 consists of insulating material and has a substantially U-shaped socket or recess 4 flanked by two substantially parallel edge portions or tongues 5, 6 which serve to locate and to guide a substantially drawer-shaped body or insert 7. The side walls of the insert 7 are provided with straight grooves 8 (see FIG. 2) which receive the tongues 5, 6 when the insert is properly installed in the housing 2. The top portion 1 has an opening 9 which is wide and high enough to permit introduction and withdrawal of the insert 7. The latter has a top wall formed with a circular aperture 10 whose axis is normal to the direction (arrow A) in which the insert is introduced into or withdrawn from the recess 4. The aperture 10 serves to permit insertion and withdrawal of a replaceable energy source 11, e.g., a miniature cell or battery.

The means for releasably clamping and holding the insert 7 in the illustrated fully inserted position comprises two clamping elements here shown as leaf springs 12, 13 which are respectively attached to the upper side and to the underside of the insulating carrier 3. These springs also serve to conduct electric current from the energy source 11 to the electrical and electronic components of the exposure control. When the battery 11 is introduced into the insert 7 by way of the aperture 10 and the insert 7 is properly received in the carrier 3, the springs 12, 13 bear against the adjacent poles of the battery. As shown in FIG. 1, a portion of the spring 12 extends into the aperture 10. The springs 12, 13 are respectively connected with conductors 14, 15 which can be said to form part of the exposure control and serve to supply current to the electrical and electronic components of such exposure control. The underside of the insert 7 is formed with a detent notch 16 which receives a tooth-like protuberance 17 of the spring 13 to thus releasably hold the insert in an optimum position. Electrical resistors 18, 19, 20, 21 and 22 are shown below the spring 13, as viewed in FIG. 2.

Figure 2:
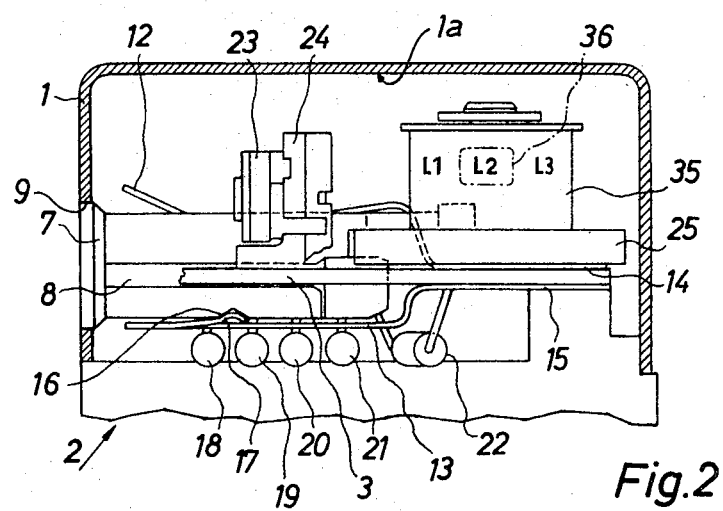
FIG. 2 is a sectional view substantially as seen in the direction of arrows from the line II—II of FIG. 1.

The adjustable electrical components of the exposure control include a potentiometer 23 which is mounted on a holder or bracket 24 positioned in such a way that the potentiometer is accessible through the opening 9 when the insert 7 is withdrawn. This enables the operator to inspect and, if necessary, repair or adjust the potentiometer 23 without necessitating detachment of the top portion 1. Additional adjustable components of the exposure control (not shown in its entirety) are mounted on the carrier 3, preferably in such a way that at least some thereof can be reached upon withdrawal of the insert 7. The carrier 3 further supports a disk-shaped or wheel-shaped actuating member or selector 25 which is milled or knurled, as at 26, and a portion of which extends outwardly through a slot 27 in the top portion 1. Thus, the operator of the camera can readily rotate the selector 25 in a clockwise or in a counterclockwise direction. The purpose of the selector 25 is to adjust the exposure control in accordance with the guide number of the source of artificial light (e.g., an electronic flash unit) when the camera is to make exposures with artificial illumination of the subject or scene. To this end, the underside of the selector 25 is connected with a sliding contact 28 which can be moved into current-conducting engagement with one of several fixed contacts 29, 30, 31, 32, 33, 34 provided on the upper side of the carrier 3. Each of the fixed contacts 29-33 (or 30-34) can connect into the circuit of the exposure control one of the resistors 18-22 when the selector 25 is caused to assume a corresponding angular position. The selector 25 carries a cylinder 35 provided with symbols (only the symbols L1, L2, L3 are shown in FIG. 2) each of which is indicative of a guide number and one of which is observable behind a window 36 in the top portion 1. This facilitates the operator's task in adjusting the exposure control in accordance with the appropriate guide number, i.e., with the guide number of the selected light source.

The selector 25 further serves as an ejector for effecting at least partial expulsion of the insert 7 from the top portion 1 so that the outwardly extending part of the insert can be readily gripped by hand to permit complete withdrawal by way of the opening 9. The selector 25 carries an axially parallel pin-shaped projection 37 which engages the innermost portion of the insert 7 when the selector 25 is rotated in the direction indicated by arrow B and beyond the last position in which one of the symbols on the cylinder 35 can be observed behind the window 36. The insert 38 has a ledge or an analogous protuberance 38 which is located in the path of the projection 37 when the selector 25 is turned in the direction indicated by the arrow B.

If the user of the camera wishes to replace the battery 11 with a fresh energy source, the selector 25 is rotated to move the projection 37 against the ledge 38 and to thus effect partial expulsion of the insert 7. The latter is thereupon withdrawn by hand, the spent battery 11 is removed and a fresh battery 11 is placed into the insert 7 by way of the aperture 10. The insert 7 is then ready for reinsertion into the housing 2 by way of the opening 9. The leaf springs 12, 13 automatically engage the adjacent poles of the freshly inserted battery 11 when the notch 16 receives the tooth 17. It is clear that the leaf springs 12, 13 can be replaced with two plugs which enter sockets in the insert when the latter is inserted into the carrier to thereby connect the poles of the energy source with the exposure control circuit. Also, the camera may include a rotary selector 25 for adjusting the exposure control in accordance with the guide number of the available source of artificial illumination and a separate ejector for the insert. Still further, instead of adjusting the exposure control in accordance with the guide number of a light source which is to be used with the camera, the member 25 (or a separate rotary or otherwise movable member on the carrier 3) may be employed to adjust the exposure control in accordance with the sensitivity of photographic film which is being used for a particular series of exposures. The exact manner in which the circuit of an exposure control can be adjusted to account for the sensitivity of photographic film forms no part of the present invention; for example, the selector 25 or another movable member can be used to adjust a variable resistor in the exposure control circuit.

If desired, the housing 2 can contain a separate ejector for the insert 7 and the leaf springs 12, 13 can be used exclusively to releasably hold the insert in the socket 4. The camera then comprises conductors which automatically engage the poles of the battery in response to complete introduction of the insert 7 into the carrier 3.

Without further analysis, the foregoing will so fully reveal the gist of the present invention that others can, by applying current knowledge, readily adapt it for various applications without omitting features which fairly constitute essential characteristics of the generic and specific aspects of our contributions to the art and, therefore, such adaptations should and are intended to be comprehended within the meaning and range of equivalence of the claims.

What is claimed as new and desired to be protected by Letters Patent is:

1. In a photographic apparatus, a combination comprising a housing having an opening; an insulating carrier installed in said housing and having a substantially U-shaped socket adjacent to said opening; an electronic exposure control including at least one component mounted on said carrier; a drawer-like insert slidably received in said socket and being withdrawable from said housing by way of said opening; a source of D-C current supported by said insert; and conductor means separably connecting said component with the poles of said source, said conductor means comprising clamping elements engaging said source to yieldably hold said insert in said socket.

2. A combination as defined in claim 1, wherein said insert has a notch and one of said clamping elements has a projection extending into said notch when the insert is received in said socket.

3. A combination as defined in claim 1, further comprising manually operated ejector means for effecting at least partial expulsion of said insert from said housing.

4. A combination as defined in claim 1, wherein said component is accessible by way of said opening upon withdrawal of said insert from said housing.

5. A combination as defined in claim 1, further comprising tongue and groove means provided on said insert and said carrier for slidably guiding said insert during introduction into and withdrawal from said housing.

6. In a photographic apparatus, a combination comprising a housing having an opening; an insulating carrier installed in said housing and having a socket adjacent to said opening; an electronic exposure control including at least one component mounted on said carrier; an insert received in said socket and being withdrawable from said housing by way of said opening; a source of D-C current supported by said insert; conductor means separably connecting said component with the poles of said source; and manually operable ejector means for effecting at least partial expulsion of said insert from said housing, said ejector means comprising a rotary member mounted on said carrier and having a portion engaging with and arranged to expel said insert from said socket through said opening in response to rotation of said member.

7. A combination as defined in claim 6, wherein said insert includes a protuberance located in the path of movement of said portion of said rotary member.

8. In a photographic apparatus, a combination comprising a housing having an opening; an insulating carrier installed in said housing and having a socket adjacent to said opening; an electronic exposure control including at least one component mounted on said carrier; an insert received in said socket and being withdrawable from said housing by way of said opening; a source of D-C current supported by said insert; conductor means separably connecting said component with the poles of said source; manually operated ejector means for effecting at least partial expulsion of said insert from said housing; and means for adjusting said exposure control in accordance with the sensitivity of selected film by way of said ejector means.

9. A combination as defined in claim 8, wherein said adjusting means includes a plurality of resistors and means movable with said ejector means for connecting a selected resistor into the circuit of said exposure control.

10. In a photographic apparatus, a combination comprising a housing having an opening; an insulating carrier installed in said housing and having a socket adjacent to said opening; an electronic exposure control including at least one component mounted on said carrier; an insert received in said socket and being withdrawable from said housing by way of said opening; a source of D-C current supported by said insert; conductor means separably connecting said component with the poles of said source; manually operated ejector means for effecting at least partial expulsion of said insert from said housing; and means for adjusting said exposure control in accordance with a selected guide number by way of said ejector means.

* * * * *